J. R. MARTIN.
BORING BAR.
APPLICATION FILED NOV. 22, 1918.
1,336,311. Patented Apr. 6, 1920.
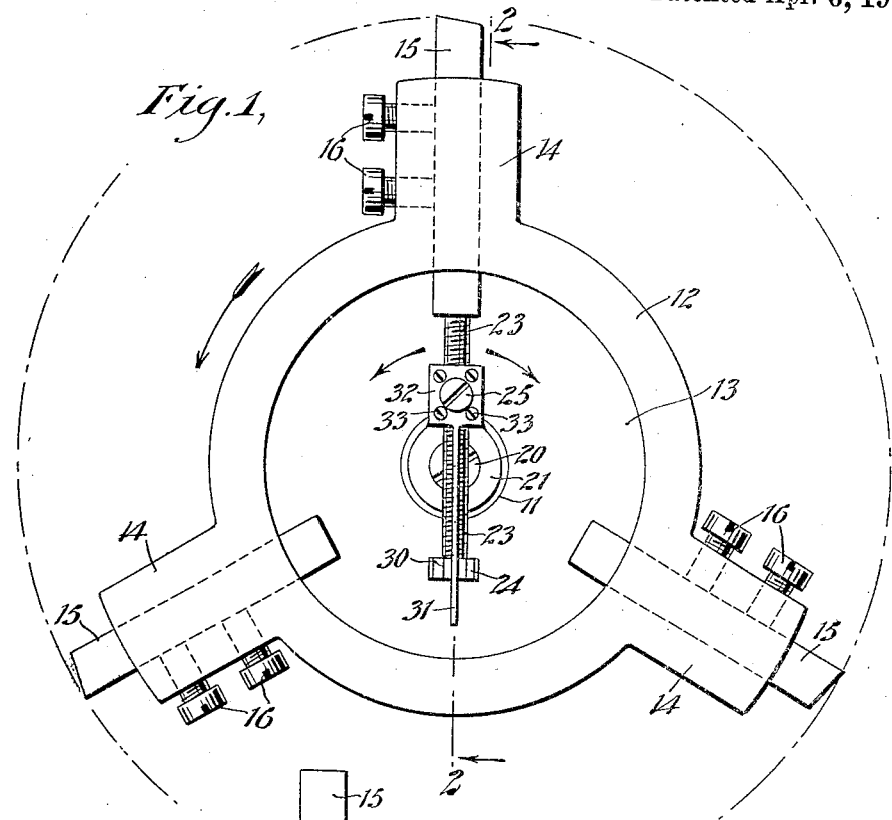
*Fig.1,*
*Fig.3.*
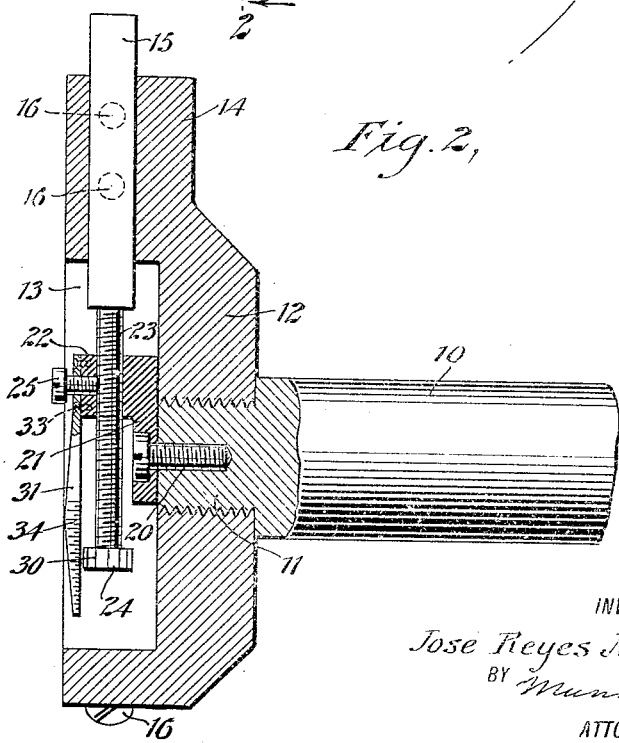
*Fig.2,*
WITNESSES
Edw. Thorpe
Geo. J. Hooker
INVENTOR
Jose Reyes Martin
BY Munn & Co
ATTORNEYS

UNITED STATES PATENT OFFICE.

JOSE REYES MARTIN, OF BROOKLYN, NEW YORK.

BORING-BAR.

1,336,311.  Specification of Letters Patent.  Patented Apr. 6, 1920.

Application filed November 22, 1918. Serial No. 263,733.

*To all whom it may concern:*

Be it known that I, JOSE REYES MARTIN, a subject of the King of Spain, and a resident of the city of New York, borough of Brooklyn, in the county of Kings and State of New York, have invented a new and Improved Boring-Bar, of which the following is a full, clear, and exact description.

The invention relates to metal working machines, such a lathes, boring machines and the like.

The object of the invention is to provide a new and improved boring bar provided with a plurality of cutters disposed circumferentially to insure accurate boring throughout the length of the bore and to permit of making a large cut at a time. Another object is to permit quick and accurate adjustment of the cutters one relative to the other and to the diameter of the bore to be bored. Another object is to permit convenient attachment of the boring head to the usual bar of a lathe, boring machine or the like.

With these and other objects in view the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a face view of the boring bar;

Fig. 2 is a longitudinal central section of the same on the line 2—2 of Fig. 1; and Fig. 3 is a perspective view of the pointer.

The boring bar 10 is provided at one end with a reduced threaded portion 11 on which screws a head 12 provided in its face with a recess 13 and having a plurality of holders or bearings 14 spaced equal distances apart circumferentially of the head and disposed radially, as plainly indicated in the drawings. In each of the holders 14 is slidably fitted a cutter 15 adapted to be fastened in place by screws or other fastening devices 16. The inner ends of the cutters 15 extend into the recess 13 of the head 12 for the purpose hereinafter more fully described.

The threaded end 11 of the bar 10 is provided with a centrally disposed pivot 20 on which is mounted to swing an arm 21 arranged within the recess 13. The arm 21 is provided on its free end with an internally threaded boss 22 in which screws a radially disposed screw rod 23 adapted to engage the inner ends of the cutters 15 to permit the user to adjust the cutters one after the other in an outward direction until the outer cutting edges of the cutters assume the desired position relative to the cut to be made in the work. After the desired adjustment is made the screws 16 are screwed up to fasten the cutters in the adjusted position. The screw rod 23 is provided with a head 24 to permit the user to conveniently turn the screw rod 23 for adjusting the cutters 15, as above explained, and the screw rod 23 is fastened in the adjusted position by a set screw 25 screwing in the boss 22 and against the screw rod 23, as plainly shown in Fig. 2.

The peripheral face of the head 24 of the screw rod 23 is provided with a graduation 30 on which indicates a pointer 31 having its base 32 fastened by screws 33 or other fastening devices to the boss 22 so that the pointer 31 moves with the arm to be at all times in indicating position relative to the graduation 30. It will be noticed that when the set screw 25 is loosened, the operator on taking hold of the head 24 can readily turn the screw rod 23 a desired amount indicated at the graduation 30 by the fixed pointer 31. Thus the operator is enabled to accurately adjust the screw rod 23 with a view to move the cutters 15 the desired distance outward for making the next cut. The pointer 31 is provided with a graduation 34 extending lengthwise of the pointer to indicate the number of turns given to the screw rod 23 thus enabling the user to make accurate but different adjustments of the several cutters 15 whenever it is desired to do so. It is understood that different adjustments of the cutters 15 may be necessary in case the cutters are not of uniform length. It is also understood that the arm 21 can be readily swung around to engage the screw rod 23 with the inner ends of the several cutters 15 for adjusting the same to insure accurate boring throughout the length of the bore. It will also be understood that by having the cutters 15 distributed circumferentially on the cutter head with their cutting edges spaced equal distances apart the cutter head is properly balanced to insure accurate boring and without producing undue vibration in the cutter head 12 and bar 10.

Having thus described my invention, I claim as new and desire to secure by Letters Patent:—

1. In a boring bar, a head provided with a plurality of radially disposed cutter holders, and a single means for and singly engaging the cutters to accurately adjust the same in their holders.

2. In a boring bar, a head attached to the bar and provided with radially disposed holders each adapted to adjustably hold a cutter, and a single adjusting device attached centrally to the bar and provided with an adjustable member adapted for movement to engage the inner ends of the cutters to independently adjust the latter in their holders.

3. In a boring bar, a head attached to the bar, and provided with radially disposed holders each adapted to adjustably hold a cutter, an adjusting device comprising an arm provided with a threaded boss and mounted to swing centrally on the end of the bar, and a screw rod screwing in the said boss and adapted to engage the inner end of each cutter.

4. In a boring bar, a head attached to the bar, and provided with radially disposed holders each adapted to adjustably hold a cutter, an adjusting device comprising an arm provided with a threaded boss and mounted to swing centrally on the end of the bar, a screw rod screwing in the said boss and adapted to engage the inner end of each cutter, the said screw rod having a head provided with a circumferentially disposed graduation, and a pointer mounted on the arm and indicating on the said graduation.

5. In a boring bar, a head attached to the bar and provided with radially disposed holders each adapted to adjustably hold a cutter, an adjusting device comprising an arm provided with a threaded boss and mounted to swing centrally on the end of the bar, a screw rod screwing in the said boss and adapted to engage the inner end of each cutter in turn, the said screw rod having a head provided with a circumferentially disposed graduation, and a pointer mounted on the arm and indicating on the said graduation, the said pointer having a graduation disposed lengthwise on the pointer and on which indicates the said screw rod head.

6. In a boring bar, a head provided at its face with a recess and at its rim with holders disposed radially, a pivot held centrally on the bar, an arm mounted to swing on the said pivot and provided with a threaded boss, the axis of the latter being disposed radially relative to the head, a screw rod screwing in the said threaded boss, the said arm and screw rod extending within the said recess in the head, cutters slidably held in the said holders and adapted to be engaged at their inner ends by the said screw rod, and fastening means for fastening the cutters in place in the holders.

7. In a boring bar, a head provided at its face with a recess and at its rim with holders disposed radially, a pivot held centrally on the bar, an arm mounted to swing on the said pivot and provided with a threaded boss, the axis of the latter being disposed radially relative to the head, a screw rod screwing in the said threaded boss, the said arm and screw rod extending within the said recess in the head, the said screw rod being provided with a head having a circumferentially disposed graduation and a pointer attached to the said boss and indicating on the graduation of the said screw rod head, cutters slidably held in the said holders and adapted to be engaged at their inner ends by the said screw rod, and fastening means for fastening the cutters in place in the holders.

JOSE REYES MARTIN.